(12) United States Patent
Chen et al.

(10) Patent No.: US 7,235,307 B2
(45) Date of Patent: Jun. 26, 2007

(54) PROCESS FOR FORMING NITROCELLULOSE FILMS

(75) Inventors: Chi-Chen Chen, Taoyuan (TW); James Russell Webster, Hsinchu (TW); Rong-I Hong, Hsinchu (TW); Yuan-Ru Tsai, Hsinchu (TW); Chi-Che Chen, Taoyuan (TW); Ko-Yuan Tseng, Keelung (TW); Ping Chang, Taipei (TW)

(73) Assignee: AST Management, Inc., Apia (WS)

( * ) Notice: Subject to any disclaimer, the term of this patent is extended or adjusted under 35 U.S.C. 154(b) by 0 days.

(21) Appl. No.: 10/969,090

(22) Filed: Oct. 20, 2004

(65) Prior Publication Data
US 2005/0191484 A1 Sep. 1, 2005

(30) Foreign Application Priority Data
Feb. 23, 2004 (TW) .............................. 93104397 A

(51) Int. Cl.
*B32B 23/04* (2006.01)

(52) U.S. Cl. .................. 428/532; 428/536; 428/537.5; 428/403; 428/407; 427/212

(58) Field of Classification Search ................ 428/532, 428/536, 537.5, 403, 407; 427/212
See application file for complete search history.

(56) References Cited

U.S. PATENT DOCUMENTS 2,964,417 A * 12/1960 Ward ..................... 106/162.72

OTHER PUBLICATIONS

"Atomization", Concept and Theory Training, www.sono-tek.com/technology/main_tech.html.

* cited by examiner

*Primary Examiner*—Leszek Kiliman
(74) *Attorney, Agent, or Firm*—Jones Day; Brett Lovejoy

(57) ABSTRACT

A process of forming a nitrocellulose film on a carrier includes the steps of (i) atomizing a nitrocellulose solution to form a plurality of fine nitrocellulose particles and (ii) evenly spraying the nitrocellulose particles on the carrier to form the nitrocellulose film. The film has a predetermined thickness. The nitrocellulose solution is atomized by an ultrasonic spraying nozzle to control a size of each of the nitrocellulose particles to be sprayed on the carrier. The nebulizer can be air-assisted by inert air to control characteristics of the nitrocellulose spray pattern.

20 Claims, 5 Drawing Sheets

```
                    ┌──────────────────┐
                    │ Atomizing Device │
                    │   (nebulizer)    │◄─────┐
                    └──────────────────┘      │
                                              │
                                     ┌─────────────┐
                                     │ Syringe Pump│
                                     └─────────────┘
```

Atomize a nitrocellulose solution to form a plurality of fine nitrocellulose particles → Evenly apply the nitrocellulose particles on the carrier to form the nitrocellulose film having a predetermined thickness on the carrier → Dry the nitrocellulose particles on the carrier until the nitrocellulose particles integrally form a substantial layer of the nitrocellulose film overlapped on the carrier to form the substrate Nitrogen / Inert gas / Air

FIG. 1

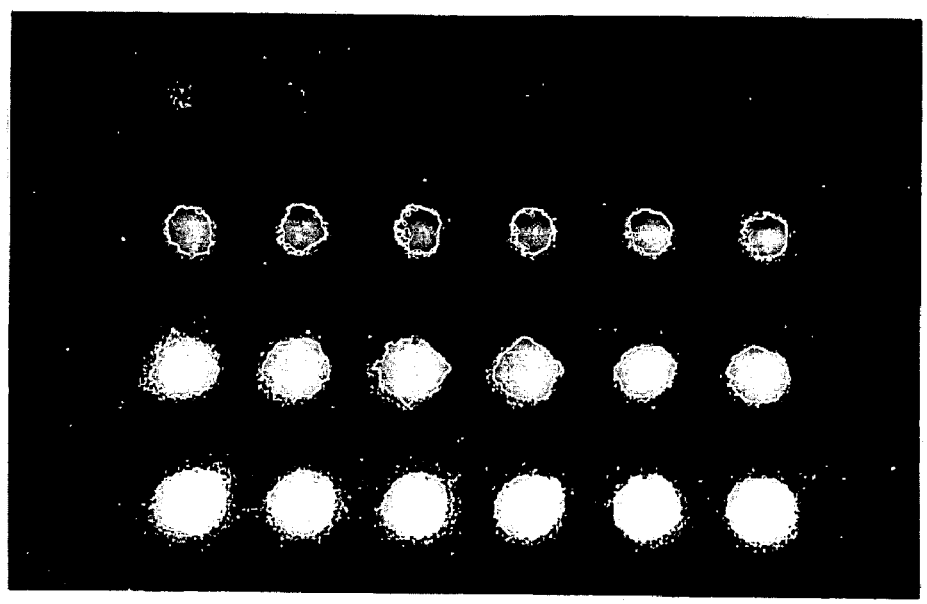
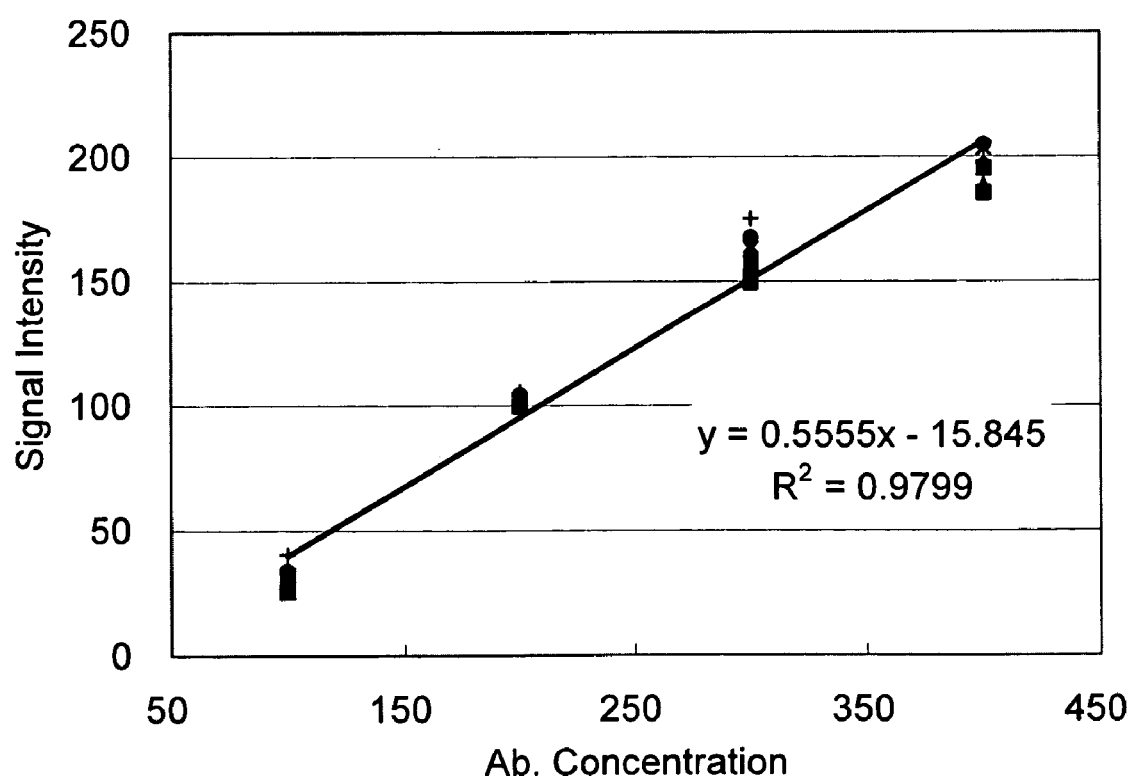
FIG. 2

PROCESS FOR FORMING NITROCELLULOSE FILMS

CROSS-REFERENCE TO RELATED APPLICATIONS

This application claims benefit, under 35 U.S.C. § 119 (a)-(d) of Taiwanese Patent Application No. 93104397, filed Feb. 23, 2004, which is incorporated herein, by reference, in its entirety.

FIELD OF INVENTION

The present invention pertains to devices with absorbent surfaces for performing binding reactions, such as antibody-antigen binding or nucleic acid hybridization.

BACKGROUND OF THE INVENTION

Molecular immobilization is one of the major technologies for life science research. Accordingly, both traditional technologies, such as hybridization, and recently developed technologies, such as biological chips, microarrays and microfluidic systems, play a key role in the bioanalysis. Generally speaking, there are five types of molecular immobilization classified for life science research: physical adsorption, ionic binding, covalent binding, cross-linking binding, and entrapping.

In physical adsorption technologies, the biospecimen is applied on a carrier by using hydrophobic interactions, hydrophilic interactions, hydrogen binding, and affinity. The advantage of physical adsorption technologies is their ease of operation, low operation cost, and relatively small impact on the integrity of the biospecimen. However, the disadvantage of physical adsorption technologies is that the immobilized biospecimen can be desorbed due to the environmental conditions such as temperature or pH.

Ionic binding technologies make use of opposite electric charges between the carrier and the biospecimen. These opposite electric charges result in electrostatic interactions between the biospecimen and the carrier that cause the biospecimen to become immobilized on the carrier. The advantages of ionic binding technologies are their ease of operation and the ability to stably fix the biospecimens on the carrier. However, the disadvantage of the ionic bonding technologies is that the molecular immobilization can become desorbed due to environmental conditions such as temperature and pH.

Covalent binding technologies make use of covalent binding between the carrier and the biospecimen to fix the biospecimen onto the carrier. Many biospecimens carry a reactive functional group. Representative reactive functional groups include, but are not limited to carboxyls, hydroxyls, aminos, and/or thiols as well as photosensitive groups (e.g. aryl azides, halogenated aryl azides, benzophenones, diazos, and diazierine derivatives). See, for example, Hermanson, *Bioconjugate Techniques*, Academic Press; 1 st edition (Jan. 15, 1996). Such functional groups can be used to form the covalent binding with the carrier thereby causing the biospecimen to become substantially immobilized on the carrier. Unlike the physical adsorption technology and the ionic binding technology, the covalent binding between the carrier and the bio-specimen is not influenced by environmental conditions such as temperature or pH. In addition, depending on the nature of the biospecimen, the carrier can be made of a wide variety of different materials, such as glass, metal, nature polymer, or artificial polymer. However, an intermediate layer, such as a coupling agent or linker, is often utilized to immobilize the biospecimen on the carrier when the bio-specimen does not carry the functional group. Examples of covalent binding technologies are found, for example, in U.S. Patent Publication Nos. 20020049152 and 20040058390 to Nock et al.

Cross-linking binding technologies use multi-functional groups as cross-linkers. Such compounds have a plurality of amino, thiol, carbonyl, and/or carboxyl reactive groups that form a network of inter-molecular interactions between the carrier and the biospecimen thereby causing the biospecimen to become attached to the carrier. Representative cross-linkers include zero-length cross-linkers (e.g., the carbodiimides EC, EDC plus sulfo-NHS, CMC, DCC, and DIC; Woodwards Reagent K; N,N'-carbonyldiimidazole, and the use of Schiff base formation coupled with reductive amination), homobifunctional cross-linkers (e.g., the homobifunctional NHS esters DSP, DTSSP, DSS, BS, DST, sulfo-DST, BSOCOES and sulfo-BSOCOES, EGS and sulfo-EGS, DSG, and DSC; the homobifunctional imidoesters DMA, DMP, DMS and DTBP; the homobifunctional sulfhydryl-reactive crosslinkers DPDPB and BMH; the difluorobenzene derivatives DFDNB and DFDNPS; the homobifunctional photoreactive crosslinker BASED; the homobifunctional aldehydes formaldehyde and glutaraldehyde; the bis-epoxides 1,4-butanediol diglycidyl ether; the homobifunctional hydrazines adipic acid dihydrazide and carbohydrazide; bis-diazoniaum derivatives and bis-alkyl-halides) and trifunctional crosslinkers (e.g., 4-azido-2-nitro-phenylbiocytin-4-nitrophenyl ester and sulfo-SBED). See, for example, Hermanson, 1996, *Bioconjugate Techniques*, Academic Press. Accordingly, a cross-linker is adapted to enhance the strength of the molecular immobilization on the carrier. However, the cross-linking binding technology may cause the denaturalization of the biospecimen.

Entrapment-type molecular immobilization technologies dispose the biomaterial on a natural or artificial polymer, such as agarose or polyacrylamide. Such polymers contain a plurality of pores each having a predetermined size for diffusion. Thus, the biospecimen becomes entrapped in these pores.

The above-described protein immobilization technologies are used for bioassays. A popular bioassay immobilization technology for use in the study of bioreactions is nitrocellulose paper. Nitrocellulose paper, which is made of a nitrocellulose polymer, has a thickness of approximately 150 micrometers and has a pore size that allows for control over the bioreaction. Nitrocellulose has a relatively strong affinity to DNA, RNA nd protein. Thus, nitrocellulose is considered to be a suitable material for the analysis of DNA, RNA, and protein because of the low cost and purity of the material. In addition, nitrocellulose prevents the denaturization of the biospecimen. Moreover, the use of nitrocellulose is relatively inexpensive because the steps required to react the biospecimen with the nitrocellulose are simple. Nitrocellulose having pore sizes anywhere in a broad range of pore sizes can be made. The diversity in pore sizes that can be used provides considerable control over the bioreaction that are run on nitrocellulose. Furthermore, nitrocellulose minimizes the environmental pollution because it is not a poisonous chemical material like those that are often used in entrapment-type molecular immobilization technologies.

In some conventional nitrocellulose molecular immobilization protocols, the nitrocellulose is applied on a glass slide by cutting the nitrocellulose paper into a desired size corresponding to the glass slide. The nitrocellulose paper can be purchased, for example, from Schleicher and Schuell (Protran Nitrocellulose Transfer Membranes, USA) or Sigma-Aldrich, USA (catalog numbers N7892, N8017, N8142, N8267, and N8392). The nitrocellulose paper is then affixed to the glass slide. Alternatively, a nitrocellulose coating is formed either by submerging the glass slide into the nitrocellulose solution or by applying the nitrocellulose solution on the glass slide by dropwise addition.

European Patent Application EP-0366241 to Brigati ("Brigati") discloses one method of forming a nitrocellulose media suitable for binding reactions. In Brigati, slides were rinsed with distilled water and then dipped in a two percent solution of APTS (Cat. No. A3648 from Sigma Chemical) in distilled water for two minutes. The slides were then rinsed by dipping in five successive one liter vessels of distilled water and dried in an 80° C. convection oven and then at room temperature in air. The slides with positively charged surfaces made by such a treatment were then dipped into conical 50 mL centrifuge tubes containing a solution of nitrocellulose in methanol. That solution had been made by cutting up two nitrocellulose membranes (88 mm by 88 mm Schleicher and Schuell BA-85) of a total weight of about 1.1 g and dissolving the pieces in a total of 30 ml of absolute methanol by rotary stirring. The slides removed from the centrifuge tubes were then dried in a horizontal orientation in a microwave oven for thirty seconds. This resulted in a clear layer of nitrocellulose having a thickness of approximately 5-10 μm thickness coating the slides glass and epoxy surfaces that had been immersed in the methanol solution. Thickness of the coating was adjusted by applying additional layers of nitrocellulose/methanol solution to the first application. The drawback of the Brigati method is that it requires multiple steps, particularly when a nitrocellulose layer having a thickness greater than 10 μm is desired.

The microassay is an important tool in many existing technologies. However, the use of nitrocellulose coating for microassay analysis, such as found in microfluidic systems, is limited by the physical properties of nitrocellulose. Such limiting properties include the difficulty in controlling nitrocellulose thickness and the complicated manufacturing process used to make nitrocellulose-based assays. Such drawbacks limit the utility of conventional nitrocellulose coatings in existing bioassays. Thus, given the above background, what are needed in the art are improved systems and methods for manufacturing nitrocellulose-based assays.

SUMMARY OF THE PRESENT INVENTION

The present invention provides methods for forming a nitrocellulose film on a carrier. In such methods, a nitrocellulose solution is atomized in order to form the nitrocellulose film. The nitrocellulose film is applied on a carrier in such a manner that the nitrocellulose film forms as a suitable media for binding receptors. The present invention further provides a process for forming a nitrocellulose film on a carrier by spraying a nitrocellulose solution on the carrier in order to form a nitrocellulose film.

The present invention further provides a process for forming a nitrocellulose film on a carrier in which the characteristics of the surface area of the nitrocellulose film can be optimized by adjustment of the air pressure, power, height and solvent used to particalize the nitrocellulose solution that is evenly sprayed on the carrier. Therefore, the present invention advantageously provides a nitrocellulose film forming process that can increase the density of immobilized molecules. This improves bioreaction rates. The process for forming a nitrocellulose film on a carrier in accordance with the present invention reduces the material loss relative to conventional processes in which nitrocellulose paper is cut to desired sizes corresponding to the shape of the carrier. In the present invention, a nitrocellulose film can be formed on a wide variety of carriers, such as silicon rubber, glass, organic or inorganic polymer or paper.

The present invention successfully provides an economic and efficient solution not only for forming the nitrocellulose coating on the carrier to enhance the application of the molecular immobilization but also for facilitating the practical use of the nitrocellulose film.

One embodiment of the present invention provides a process of forming a nitrocellulose film on a carrier. In this embodiment, a nitrocellulose solution is atomized to form a plurality of fine nitrocellulose particles. The nitrocellulose particles are evenly sprayed on the carrier in order to form a nitrocellulose film having a predetermined thickness on the carrier.

These and other objectives, features, and advantages of the present invention will become apparent from the following detailed description, the accompanying drawings, and the appended claims.

BRIEF DESCRIPTION OF THE DRAWINGS

FIG. 1 is a flow diagram illustrating a process of forming a nitrocellulose film on a carrier according to a preferred embodiment of the present invention.

FIG. 2 illustrates the nitrocellulose film used in a microfluidic system according to the above preferred embodiment of the present invention.

Figure 3A:
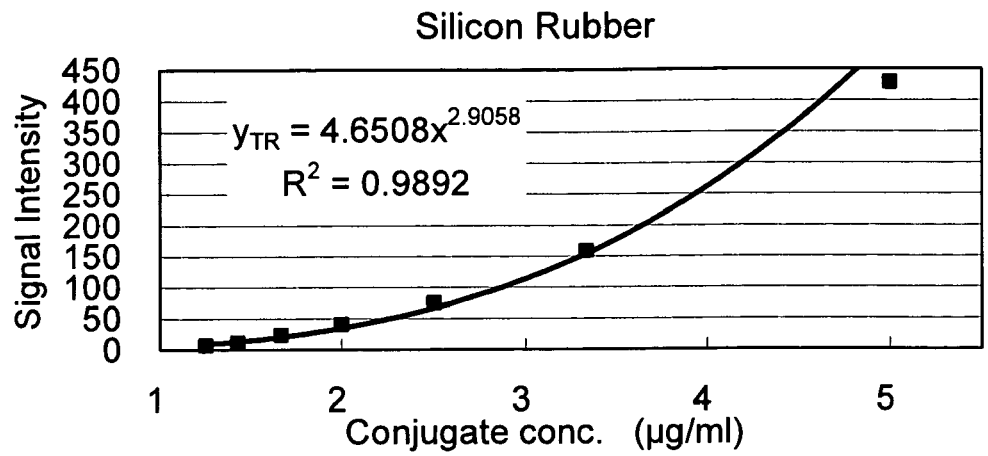
FIG. 3 illustrates the analysis results from using the nitrocellulose film on silicon rubber carrier, glass carrier and plastic carrier for a bioassay according to the above preferred embodiment of the present invention.

DETAILED DESCRIPTION OF THE PREFERRED EMBODIMENT

Referring to FIG. 1 of the drawings, a process of forming a nitrocellulose film on a carrier according to a preferred embodiment of the present invention is illustrated. The inventive process comprises the following steps:

(ONE) A nitrocellulose solution is atomized to form a plurality of fine nitrocellulose particles.

(TWO) The nitrocellulose particles are evenly applied on the carrier in order to form the nitrocellulose film having a predetermined thickness on the carrier.

The nitrocellulose solution can be obtained by dissolving nitrocellulose into a solvent. The solvents used to dissolve nitrocellulose can be divided into three groups (i) true solvents, (ii) latent solvents, and (iii) non-solvents. True solvents are those agents that are capable of dissolving nitrocellulose themselves. True nitrocellulose solvents include ketones (e.g., acetone, methyl ethyl ketone, and methyl isobutyl ketone), esters (e.g., ethyl acetate, propyl acetate, and butyl acetate), and glycol ethers (e.g., methyl glycol ether, ethyl glycol ether, and isopropyl glycol ether). Latent solvents act as nitrocellulose solvents only in the presence of true solvents. Latent solvents include, but are not limited to alcohols (e.g., ethanol, propanol, and butanol) and ethers (e.g., diethyl ether). Non-solvents do not have any solvent properties but are used as extenders and diluents in conjunction with true solvents. Examples of non-solvents include but are not limited to aliphatic and aromatic hydrocarbons (e.g., petroleum fractions, toluene, and xylene). Thus, prior to step 1, a solubilized nitrocellulose solution is obtained using any combination of true solvents, latent solvents, and non-solvents that is capable of dissolving nitrocellulose. In addition, dissolved nitrocellulose can be obtained using other methods known in the art that do not include the compounds described above.

Step One

Ultrasonic spraying device. In some embodiments, the nitrocellulose solution is atomized in step (1) using an ultrasonic spraying device (ultrasonic nozzle). As used herein, a nitrocellulose solution is a solution that contains between 0.1 percent weight/volume and 99.9 percent weigh/volume nitrocellulose. That is, the solution may comprise other compounds or biological macromolecules provided that the amount of nitrocellulose in the solution is in the previously defined range. The ultrasonic spraying device includes a nitrocellulose solution container and a spraying nozzle that is communicatively extended from the nitrocellulose solution container. The ultrasonic spraying nozzle atomizes the nitrocellulose solution in order to apply an even spray of nitrocellulose particles on the carrier. Exemplary ultrasonic spraying nozzles are commercially available from Sono-Tek Corporation (Milton, N.Y.). Exemplary Sono-Tek models include the 8700-25, 8700-35, 8700-48, 8700-48H, 8700-60, 8700-120, and 8600-6015. In general, the drops produced by ultrasonic atomization have a relatively narrow size distribution. Median drop sizes range from 18-68 microns, depending on the operating frequency of the specific type of nozzle. As an example, for a nozzle with a median drop size diameter of approximately 40 microns, 99.9% of the drops will fall in the 5-200 micron diameter range.

Ultrasonic atomization arises when a liquid film is placed on a smooth surface that is set into vibrating motion such that the direction of vibration is perpendicular to the surface, the liquid absorbs some of the vibrational energy, which is transformed into standing waves. These waves, known as capillary waves, form a rectangular grid pattern in a liquid on a surface with regularly alternating crests and troughs extending in both directions.

When the amplitude of the underlying vibration is increased, the amplitude of the waves increases correspondingly; that is, the crests become taller and troughs deeper. A critical amplitude is ultimately reached at which the height of the capillary waves exceeds that required to maintain their stability. The result is that the waves collapse and tiny drops of liquid are ejected from the tops of the degenerating waves normal to the atomizing surface.

Ultrasonic nozzles employ high frequency sound waves. In some cases, disc-shaped ceramic piezoelectric transducers convert electrical energy into mechanical energy. The transducers receive electrical input in the form of a high frequency signal from a power generator and convert that into vibratory motion at the same frequency. In some cases, two titanium cylinders magnify the motion and increase the vibration amplitude at the atomizing surface.

Ultrasonic nozzles are configured such that excitation of the piezoelectric crystals creates a transverse standing wave along the length of the nozzle. The ultrasonic energy originating from the crystals located in the large diameter of the nozzle body undergoes a step transition and amplification as the standing waves traverse the length of the nozzle.

Figure 4:
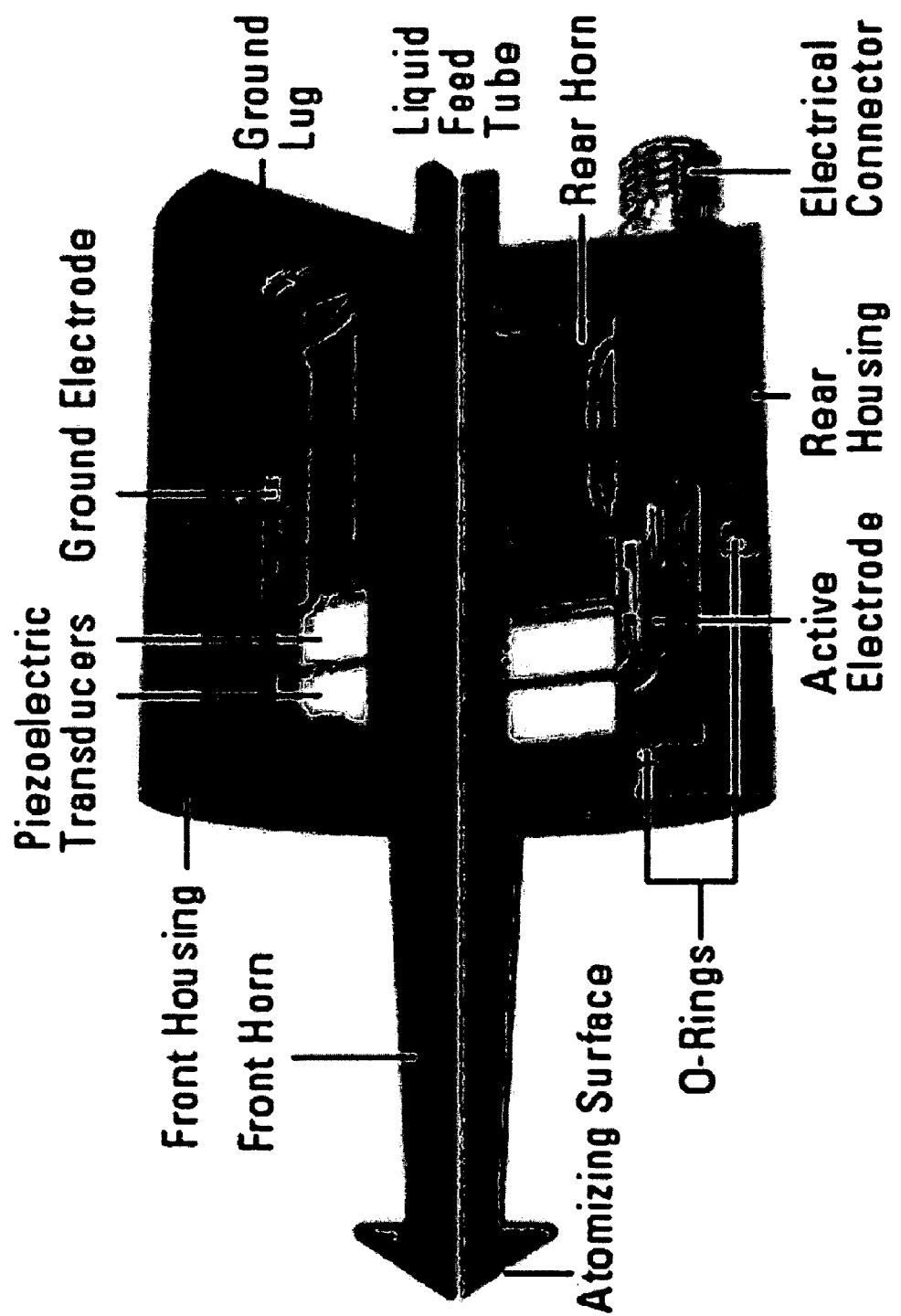
FIG. 4 illustrates an ultrasonic nozzle in accordance with the prior art.

As illustrated in FIG. 4, the ultrasonic nozzle is designed such that a nodal plane is located between the piezoelectric crystals. For ultrasonic energy to be effective for atomization, the atomizing surface (nozzle tip) is located at an anti-node, where the vibration amplitude is greatest. To accomplish this, the nozzle's length is a multiple of a half-wavelength. Since wavelength is dependent upon operating frequency, nozzle dimensions are governed by frequency. In general, high frequency nozzles are smaller, create smaller drops, and consequently have smaller maximum flow capacity than nozzles that operate at lower frequencies. In some instances, the ultrasonic nozzle body is fabricated from titanium because of its good acoustical properties, high tensile strength, and excellent corrosion resistance.

Preferably, a syringe pump is used to feed the nitrocellulose solution into the feed tube of the ultrasonic spraying nozzle. However, other feeding methods are possible, including but not limited to gravity, electric potential difference, and pressurized injection.

During nitrocellulose solution atomization, nitrocellulose particle size is selectively adjusted by adjustment of the atomization power. In a specific embodiment, a stall power of 5 watts is used in order to achieve desired particle size. More generally, the atomization power will depend upon the type of solvent that is used to dissolve the nitrocellulose. Generally speaking, the atomization power should be the stall power plus about 0.5 watts. In addition, the thickness of the nitrocellulose film is selectively adjusted by the flow rate of the ultrasonic spraying nozzle. Advantageously, the nitrocellulose particles are homogeneous in size. Thus, when the nitrocellulose particles are sprayed on the carrier they form a nitrocellulose layer having uniform thickness, thereby enhancing the quality of the nitrocellulose film for bioreaction.

In some embodiments, the spray produced by the ultrasonic nozzle is focused using an air shroud. Compressed gas, typically at 1 pound per square inch, is introduced into the diffusion chamber of the air shroud, producing a uniformly distributed flow of air around the ultrasonic nozzle tip. The ultrasonically produced spray from the nozzle is immediately entrained in the air stream. An adjustable focusing mechanism allows control of the spray width.

Pressure nozzles. In some embodiments, rather than using an ultrasonic nozzle for step (1), a pressure nozzle is used. The basic function of pressure nozzles is to convert the pressure energy supplied by a high-pressure pump into kinetic energy in order to form a thin film, the stability of which is determined by the properties of the liquid such as viscosity, surface tension, density and quantity per unit of time, and by the medium onto which the liquid is sprayed.

Commercially available pressure nozzles are typically designed with a swirl chamber giving the liquid a rotation, so that it will leave the orifice, the second main component of a pressure nozzle, as a hollow cone. The obtained spray pattern is a function of the operating pressure. Capacity can usually be assumed directly proportional to the square root of the pressure:

$$\text{Capacity kg/h} = K \times \sqrt{P}$$

Higher viscosity, liquid density and surface tension and lower pressure will result in bigger particles. Many proposed correlations have been reported, but the one below can be used with a certain degree of confidence:

$$d_s = 157\left(\frac{\sigma}{P}\right)^{0.5} + 597\left[\left[\left(\frac{\mu}{\sigma PL}\right)^{0.45} x \left(\frac{Q}{K_n x d_o \left(\frac{P}{PL}\right)^{0.5}}\right)\right]^{1.5}\right]$$

where,
 $d_s$=volume particle mean diameter of the spray (microns),
 σ=surface tension of liquid (dynes/cm),
 P=nozzle pressure (p.s.i.),
 µ=viscosity of liquid (poises),
 PL=liquid density gm/cc,
 Q=volumetric feed rate/unit of time,
 $K_n$=nozzle constant (depending on spray angle), and
 $d_o$=orifice diameter (inches).

A commercially available example of a pressure nozzle is the Bete MicroWhirl (Industrial Mechanical Specialties, Inc., Thornhill, ON). In some embodiments, an air stream drives the nitrocellulose solution through the pressure nozzle.

Nebulizers. Any type of nebulizer (atomizer) can be used in step (1). Examples of ultrasonic nozzles and pressure nozzles have been described above. In some embodiments, the atomizing device comprises a nebulizer in which a nitrocellulose solution is guided to flow through a tube by a high-pressure stream of gas flow flowing at the tip of the tube to control a size of each of the nitrocellulose particles to be sprayed on the carrier. In some embodiments, the nebulizer is air-assisted using a gas such as nitrogen in order to control a flow rate of the nitrocellulose particles at the nebulizer so as to control the thickness of the nitrocellulose film on the carrier.

For operational convenience, a tip can be used with the nebulizer. Exemplary tips that can be used include each of the nozzles in the Unijet nozzles product family that is manufactured by Spraying Systems Company (Wheaton, Ill.). Exemplary embodiments of tips that can be uses further include nozzles in the ProMax Quickjet Product family line that is manufactured by Spraying Systems Company (Wheaton, Ill.). Such nozzles include, but are not limited to the ProMax Quick VeeJet nozzle, the ProMax Quick Fulljet nozzle, the ProMax Quick WhirlJet nozzle, and the Miniature ProMax Quick VeeJet nozzle product subfamilies. Exemplary ProMax Quick VeeJet spray nozzles include the QPTA__10, QPTA__15, QPTA__20, QPTA__30, QPTA__40, QPTA__50, QPTA__60, and QPTA__70. Exemplary Quick FullJet spray nozzles include the QPHA1, QPHA1.5, QPHA2, QPHA3, QPHA3.5, QPHA5, QPHA6.5, QPHA10, and the QPHA15. Exemplary ProMax Quick FullJet spray nozzle includes the QPHA2.8W, QPHA4.3W, QPHA5.6W, QPHA8W, QPHA10W, QPHA12W, and the QPHA14W. Exemplary ProMax Quick WhirlJet spray nozzles include the QPAA0.5, QPAA1, QPAA2, QPAA3, QPAA5, QPAA8, QPAA10, QPAA15, QPAA5W, QPAA8W, QPAA10W, and QPAA15W. Exemplary Miniature ProMax Quick VeeJet nozzles include the QMVV__015, QMVV__001, QMVV__002, QMVV__003, QMVV__04, QMVV__05, QMVV__06, and QMVV__08.

Step Two

The nitrocellulose solution is atomized in step (1). In step (2) the atomized nitrocellulose is sprayed onto a carrier. In some embodiments, the distance between the tip of the spraying element (e.g., ultrasonic nozzle) and the carrier is between about 3 cm and 20 cm. More preferably, the distance between the tip of the spraying element (e.g., ultrasonic nozzle) and the carrier is between about 3 cm and 5 cm. In a preferred embodiment, the distance between the tip of the spraying element (e.g., ultrasonic nozzle) and the carrier is greater than 3.5 cm. In some embodiments, an X-Y robot is used to control the positional relationship between the carrier and the spraying element. In this way, there is control over what portions of the carrier are coated with a nitrocellulose film. An X-Y robot consists of two single-axis robot controls. In practice, the substrate is placed on the X-Y robot platform and the substrate is moved relative to the stationary spraying element in a programmable fashion. In this way, highly specific spraying regimens can be programmed using a controller (computer) that controls the X-Y robot. The purpose of such spraying regimens is to obtain a highly uniform nitrocellulose film on the substrate. In an exemplary spraying regimen, the X-Y robot is programmed to move in the X direction seven times (increments) while the spraying element is spraying atomized nitrocellulose onto the substrate and then the X-Y robot is programmed to move in the Y direction seven times (increments) while the spraying element is spraying atomized nitrocellulose onto the substrate. Such a spraying regimen is merely exemplary. Upon review of this disclosure, those of skill in the relevant arts will appreciate the utility of using an X-Y robot to deliver a homogenous layer of nitrocellulose onto a substrate using the methods of the present invention. Programmable X-Y robots that can support the substrates used in the present invention are commercially available. X-Y robots (X-Y stages) include any motor or manually driven X-Y stage including, but not limited to Micro Controle XY stages, Parker stages, and Anorad WKY XY positioning stages.

The nitrocellulose film formed on the carrier has a thickness between 0.5 µm and 100 µm. In contrast, conventional nitrocellulose films have a thickness between 10 µm and 15 µm. In conventional processes, if thicker films are desired, multiple coats are typically required. In preferred embodiments, the thickness of the nitrocellulose film is adjusted in increments of between 0.2 µm and 1.8 µm in accordance with the needs of a given microassay application.

Optional Step Three

One process in accordance with the present invention further comprises the additional step of drying the nitrocellulose particles on the carrier until the nitrocellulose particles integrally form a layer of nitrocellulose film on all or a substantial portion of the carrier. The carrier (e.g., glass, silicon rubber, plastic) and the overlayed layer of nitrocellulose film together form the substrate for a bioassay. In this step, the nitrocellulose film is substantially formed when the nitrocellulose particles are dried on the carrier at room temperature. Alternatively, the carrier is adapted to place in an oven at low temperature (e.g., 30-45° C. for between 5 and 30 minutes) in order to enhance the nitrocellulose film drying process.

It is worth mentioning that, since the nitrocellulose particles are sprayed on the carrier to form the nitrocellulose film, the nitrocellulose film fits to the size of the carrier. Therefore, the user does not need to cut conventional nitrocellulose paper in order to fit the carrier. In other words, no material is wasted when the nitrocellulose particles are sprayed on the carrier. In addition, the process of the present invention does not require a rigid polymer layer to be preformed.

Suitable Carriers

Example two illustrates how the methods of the present invention can be used to deposit nitrocellulose on glass, silicon rubber, and plastic. More generally, in some embodiments, the carrier is made out of a plastic or a rubber. In some embodiments, the carrier is made out of high-density polyethylene, low-density polyethylene, polypropylene, cellulose acetate, vinyl, plasticized vinyl, cellulose acetate butyrate, melamine-formaldehyde, polyester, nylon. See, for example, *Modern Plastics Encyclopedia*, McGraw-Hill.

In some embodiments the carrier is made of rubber, a rubberlike material, a rubber derivative, silicone rubber, or an elastomer. In some embodiments, the carrier is made of natural rubber, vulcanized rubber, a butadiene-styrene polymer such as GR-S, neoprene, nitrile rubbers, butyl, polysulfide rubber, ethylene-propylene rubber, polyurethane rubber, silicone rubber, gutta-percha, and/or balata. In some embodiments the carrier is made out of silicone rubber. Silicone rubber is a rubberlike material having a tensile strength of between 400 lb/in2 to 700 lb/in2 (2.78 to 4.85×106 N/m2) elongation. In some embodiments, cups 102 and 104 are made of Silastic® silicone rubber (Dow Corning). As used herein the term elastomer is used to describe both natural and synthetic materials which are elastic or resilient and in general resemble natural rubber in feeling and appearance. See, for example, Avallone and Baumeister III, *Marks' Standard Handbook for Mechanical Engineers*, McGraw Hill, 1987, which is hereby incorporated by reference. In some embodiments, the carrier has a side with a total surface area less than 10,000 cm$^2$, 1,000 cm$^2$, 100 cm$^2$, 10 cm$^2$, or 1 cm$^2$.

Exemplary Apparatus

Figure 5:
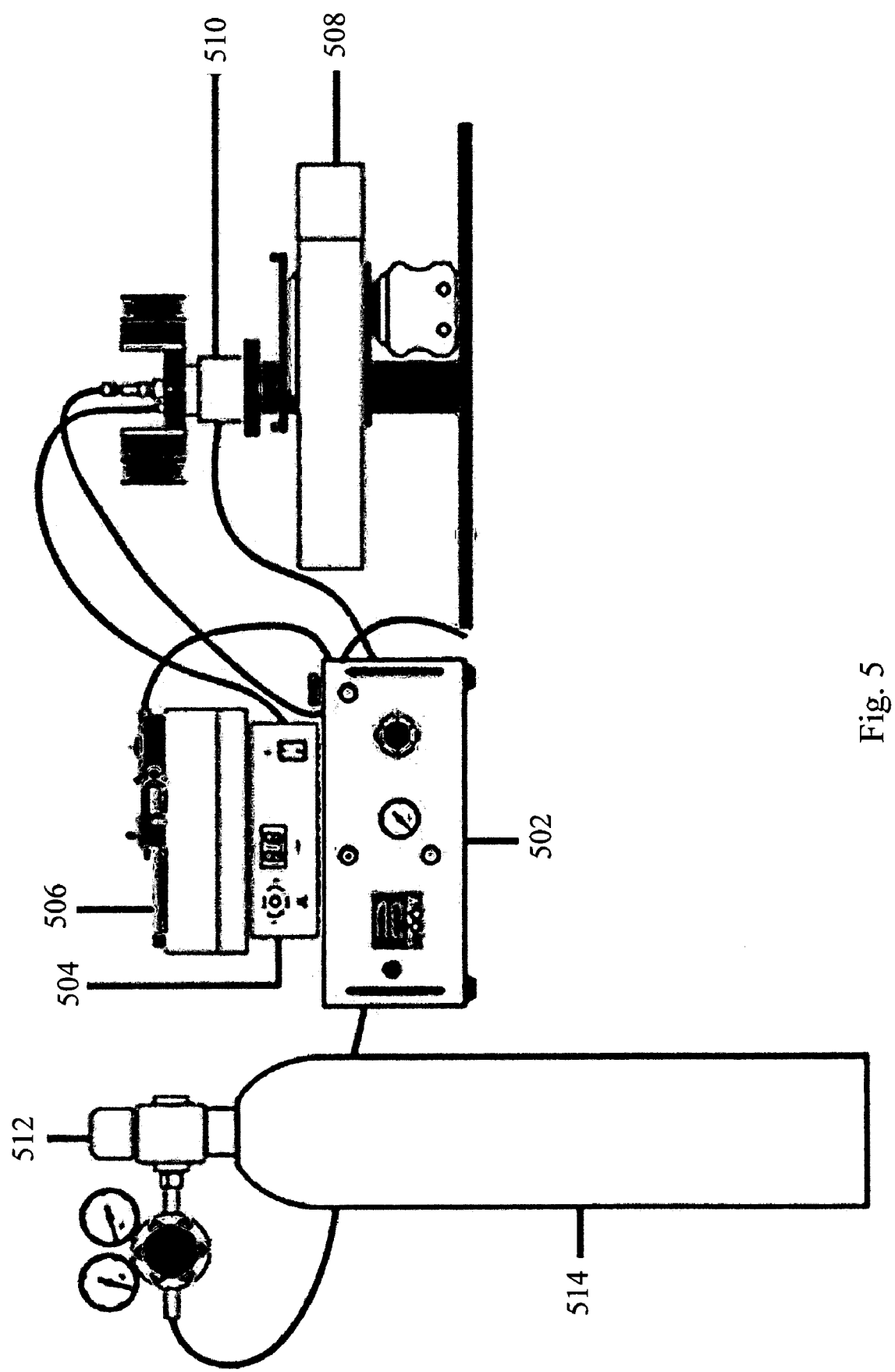
FIG. 5 illustrates an apparatus that can be used to administer the methods of the present invention.

FIG. 5 illustrates an apparatus that can be used to perform the inventive methods of the present invention. The apparatus includes control box 502 that is used to control the nebulizer, X-Y robot, nitrogen gas, power, syringe pump. The apparatus includes a power supply 504 to power the nebulizer. Further, the apparatus includes a micro-injector 506 to inject nitrocellulose solution into the nebulizer. The substrate is mounted on the stage of an X-Y robot 508 below the nozzle 510 of the nebulizer. A nitrogen cylinder 514, regulated by a valve 512 is used to control a flow rate of the nitrocellulose particles at the nebulizer so as to control the thickness of the nitrocellulose film on the carrier

EXAMPLE ONE

The following example illustrates how a nitrocellulose film is formed on a carrier made of silicon rubber. First, the carrier is cleaned by submerging it into 600 milliliters of reverse osmosis (RO) water solution mixed with 1 milliliter of detergent. Then, the carrier is ultrasonically cleaned for ten minutes and rinsed at least three times with the reverse osmosis (RO) water solution. Last, the carrier is placed in an oven for 60 minutes at 45° C. to dry the carrier.

A volume of 8000 microliters of nitrocellulose solution is pumped into a nitrocellulose solution container using a syringe pump. The outgoing pump rate of the syringe pump is set at 5000 microliters per minute and the injection pump rate is set at 72 microliters per minute. The power of the ultrasonic spraying nozzle is set at 3 watts with an air pressure at 5 pounds per square inch. This causes the nitrocellulose solution to be atomized at the ultrasonic spraying nozzle. The atomized nitrocellulose is sprayed on the carrier for thirty seconds with a spraying distance of 9.6 centimeters between the ultrasonic spraying nozzle and the carrier.

According to preferred embodiments of the present invention, the nitrocellulose film is adapted for use in a microfluidic system. For example, various concentrations, such as between 100 µg/mL and 400 µg/mL of anti-methamphetamine antibody is immobilized on the nitrocellulose film. Then, a sample containing methamphetamine and methamphetamine-conjugated horseradish peroxidase (1:5) is added for a competitive immunoassay. A signal is produced by treatment with chemiluminescent substrate and the image is captured by cooled CCD, as shown in FIG. 2.

EXAMPLE TWO

Figure 3B:
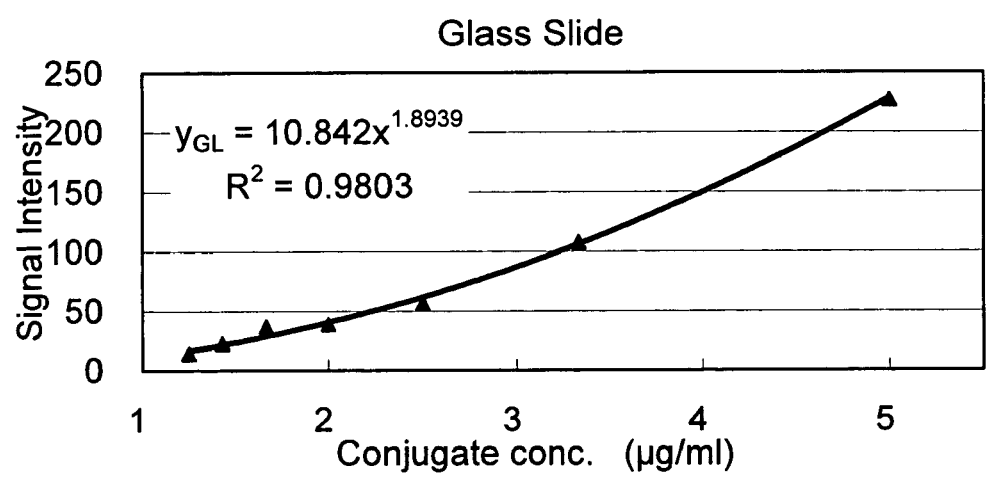
Figure 3C:
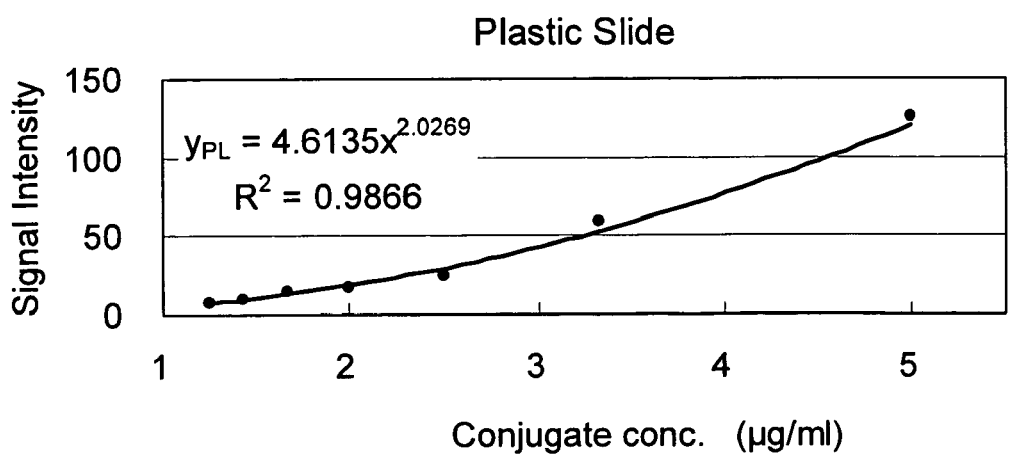

This example illustrates how the carrier can be made of various materials including, but not limited to, silicon rubber, glass, and plastic. Human feto-protein monoclonal antibody having a concentration of 50 mg/mL is diluted to form solutions with dilution ratios of 1/100, 1/150, 1/200, 1/250, 1/300, 1/350, and 1/400 with respect to the original concentration. These diluted solutions were then spotted onto the nitrocellulose in order to form varying degrees of biospecimen density. The spotted surfaces of the carriers were rinsed by the 10×PBS buffer. Then, the substrate of 40 µL of SuperSignal® West Femto Luminol Enhancer Solution (HRP) was added onto the carrier. After allowance of a 60 second reaction time, the image signals were captured by the cooled CCD using 40 second exposure intervals. The results shown in FIGS. 3A through 3C illustrate a successful reaction and therefore serve to illustrate how the nitrocellulose film can be coated on different materials of the carriers for bioassay.

CONCLUSION

All references cited herein are incorporated herein by reference in their entirety and for all purposes to the same extent as if each individual publication or patent or patent application was specifically and individually indicated to be incorporated by reference in its entirety for all purposes.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of forming a nitrocellulose film on a microassay carrier, comprising:
   (a) ultrasonically atomizing a nitrocellulose solution to form atomized nitrocellulose; and
   (b) spraying said atomized nitrocellulose on said microassay carrier to form said nitrocellulose film.

2. The method of claim 1, wherein said nitrocellulose solution is atomized by an ultrasonic spraying nozzle that controls a particle size of said atomized nitrocellulose.

3. The method of claim 2 wherein said nitrocellulose solution is fed into said ultrasonic spraying nozzle through a syringe pump.

4. The method of claim 3, wherein said ultrasonic spraying nozzle is air-assisted using an air shroud in order to control a characteristic of said atomized nitrocellulose.

5. The method of claim 1, wherein said spraying causes a nitrocellulose film having a thickness between 0.2 μm and 100 μm to be formed on said microassay carrier.

6. The method of claim 1, wherein said spraying causes a nitrocellulose film having a thickness between 0.2 μm and 50 μm to be formed on said microassay carrier.

7. The method of claim 1, further comprising a step of drying said carrier after said spraying until said nitrocellulose film is formed on said microassay carrier.

8. The method of claim 1, wherein said microassay carrier is made of a material selected from the group consisting of silicon rubber, glass, organic polymer, inorganic polymer, and a combination thereof.

9. A substrate, comprising:
a microassay carrier; and
a nitrocellulose film, wherein said nitrocellulose film has been formed on said carrier by
(a) ultrasonically atomizing a nitrocellulose solution to form atomized nitrocellulose; and
(b) spraying said atomized nitrocellulose on said microassay carrier to form said nitrocellulose film.

10. The substrate of claim 9, wherein said nitrocellulose film has a thickness between 0.2 μm and 100 μm.

11. The substrate of claim 9, wherein said microassay carrier is made of a material selected from the group consisting of silicon rubber, glass, organic polymer, and inorganic polymer, and a combination thereof.

12. The substrate of claim 9, wherein said nitrocellulose solution is atomized by an ultrasonic spraying nozzle that controls a particle size of said atomized nitrocellulose.

13. The substrate of claim 12 wherein said nitrocellulose solution is fed into said ultrasonic spraying nozzle through a syringe pump.

14. The substrate of claim 13, wherein said ultrasonic spraying nozzle is air-assisted using an air shroud in order to control a characteristic of said atomized nitrocellulose.

15. The method of claim 1, wherein said microassay carrier comprises a glass material, a rubber material, or a plastic material.

16. The method of claim 15, wherein said rubber material comprises a natural rubber material, a rubberlike material, a rubber derivative material, a silicone rubber material, or an elastomer material.

17. The method of 15, wherein said rubber material comprises natural rubber, vulcanized rubber, a butadiene-styrene polymer such as GR-S, neoprene, nitrile rubbers, butyl, polysulfide rubber, ethylene-propylene rubber, polyurethane rubber, silicone rubber, gutta-percha, or balata.

18. The method of claim 15, wherein said plastic material comprises high-density polyethylene, low-density polyethylene, polypropylene, cellulose acetate, vinyl, plasticized vinyl, cellulose acetate butyrate, melamine-formaldehyde, polyester, or nylon.

19. The method of claim 1, wherein said microassay carrier has a side with a total surface area less than 10,000 $cm^2$.

20. The method of claim 1, wherein said microassay carrier has a side with a total surface area less than 10 $cm^2$.

* * * * *